April 29, 1952     H. O. SCHJOLIN     2,594,811
VEHICLE DRIVE CONTROL
Original Filed Oct. 21, 1943     3 Sheets-Sheet 1

Inventor
Hans O. Schjolin
By Blackmore, Spencer + Flint
Attorneys

April 29, 1952 H. O. SCHJOLIN 2,594,811
VEHICLE DRIVE CONTROL
Original Filed Oct. 21, 1943 3 Sheets-Sheet 3

Inventor
Hans O. Schjolin
By
Blackmore, Spencer & Flett
Attorneys

Patented Apr. 29, 1952

2,594,811

UNITED STATES PATENT OFFICE 2,594,811

VEHICLE DRIVE CONTROL

Hans O. Schjolin, Birmingham, Mich., assignor to General Motors Corporation, Detroit, Mich., a corporation of Delaware Original application October 21, 1943, Serial No. 507,204, now Patent No. 2,435,930, dated February 10, 1948. Divided and this application August 21, 1945, Serial No. 611,789

26 Claims. (Cl. 192—.073)

The invention herein relates to motor vehicles, and especially to an improved compact grouping of driving mechanism for large heavy duty vehicles such as buses, trucks, and those of military nature.

In order to arrange the driving mechanism in a small space, for detracting least from the useful load space, the present invention therefore embodies a special drive arrangement for imparting the torque to the vehicle wheels with a minimum loss of power conversion, accomplished by mounting the entire torque multiplying mechanism at an angle to the engine shaft. By this arrangement, differing radically from others, the direct drive clutch shift and control elements are located separately, compartmented from, and at one side of the torque converter, accessible for repair and replacement. The net space saving achieved by the invention, in rear-engined vehicles is considerable.

A further advantage is an arrangement which lends itself to variations in form and size of torque converters to be used, and in the selection of different engines and input gear driving ratios to suit space and power requirements for given vehicles, so as to make it possible to utilize the same fundamental output gear and shafting combination with different drive units. By this means, if it be desired to use either a gasoline engine or a slower running diesel having a different type of power curve, but with the same peak horse power, the same converter may be used without distributing the remainder of the drive, while obtaining the best performance from the converter with either engine. It is also to be observed that with the present arrangement, the dimensions of the angle drive gears and bearings are much reduced as compared with earlier arrangements, since in the present invention the gears are only required to handle engine torque rather than load torque. A further advantage is derived from the fact that the center of gravity in the present drive unit is much closer to the engine, than in standardized installations, and that the net torque reaction to be taken is of low value as well as being exerted through a shorter lever arm, cutting down shock loads from propeller shaft thrust. The short overhang reduces impact loads on the drive mounting.

The accessibility of those portions of the drive requiring frequent attention is an outstanding part of the invention, namely; the torque converter unit, the overrunning clutch and the friction clutch assembly. This facilitates the speed at which a converter or clutch unit may be serviced in the garage or in the field so that the vehicle remains in operation over a longer period without service delay. The remainder of the drive for the most part becomes a permanent part of the vehicle. It is obvious that the reduction in size of the driving and drive-supporting parts because of the reduction of the loading effect, creates a considerable cost saving, and substantial saving of overall weight. The whole torque reaction is supported on the engine mounting, likewise an important feature.

By the arrangement described herein, the fluid torque converter drive only requires a minimum of readily changeable fluid seals, and as will be seen, the passage of fluid to and from the drive assembly is handled through simple openings, one in the rear bearing cap and the other through a casing hole at the periphery of the assembly. A further advantage appears in the fastening of the second stage converter guide vanes of the torque converter directly to the casing. An additional advantage lies in the inclusion of the clutch and converter cover portion of the casing with the front bearing of the transmission assembly, further facilitating disassembly and repair. The location of the clutching means in the angular shaft assembly is a distinguishing useful feature not believed shown in the prior art. The propeller shaft couples one end of the angular drive assembly to the axle differential without interfering with the spring action or mounting.

The foregoing objects and advantages are disclosed in, and the new driving structure is claimed in the original application to the present disclosure, namely Serial Number 507,204 filed October 21, 1943, now Patent No. 2,435,930, the present divisional application dealing with the features of the invention pertaining more directly to actuation and control means for the drive mechanism illustrated, but including reference to such structure when required to state a cooperative unity.

The present disclosure therefore provides a special arrangement of simple and compact controls for the shifting of the double clutch drive-ratio changing elements, with positive remote station operation by the driver by appropriate controlling apparatus.

Of particular utility is the arrangement of interlocking controls which provides full automatic forward drive with ratio lockout shift interconnection so that the vehicle operator retains full control of all ratio shift functions for stopping or reversing. A further improvement lies in the novel means described herein for more accurate determination of automatic ratio changes on the part of the operator, and correspondingly improved driver-feel of the operator-connected elements participating in the automatic ratio change sequences.

Figure 1 is a partial view of the rear drive plan of the invention for a motor bus. In this figure, the engine E driving through a vibration damper D, delivers its torque to the output shaft flange 30ª through one of the clutches of the double clutch assembly C; or through the other of said clutches coupled to a turbine torque converter and through a roller clutch R, located at a point convenient for inspection and replacement. A gearbox G provides the means for selecting forward and reverse drive, or neutral. In Figure 1 is shown a universal joint U connected to output driving flange 30ª, and driving a diagonal jack shaft 50, universal joint 60 and differential gear 70 which in turn transmits the drive to the vehicle wheels. It will be noted that the only angular conversion of power between the engine and the parallel rear axle, other than by the differential gear of the axle, is by the power shaft input gearing adjacent the vibration dampener D.

Figure 2 shows in plan detail the structural arrangement of the supporting and driving parts. It should be observed that the engine casing, clutch and converter housings and gear casing are integrally supported against torque reaction. With a right-hand rotating engine, the reaction couple is downward at the right of the engine, while the adjacent portion of the gearbox G under forward drive sustains a reaction couple adding to the first.

The casing at the left of the figure has flanged plate 100f removable for service or replacement of roller clutch R without disturbing the other drive elements, and the external member of the unit R is removable by releasing bolts (not numbered). The turbine casing 100c is joined to the clutch casing 100a at X by stud bolts or equivalent fastenings, so that the turbine device and its clutches are readily serviced or replaced without affecting the other more permanent units of the drive mechanism.

Figure 1:
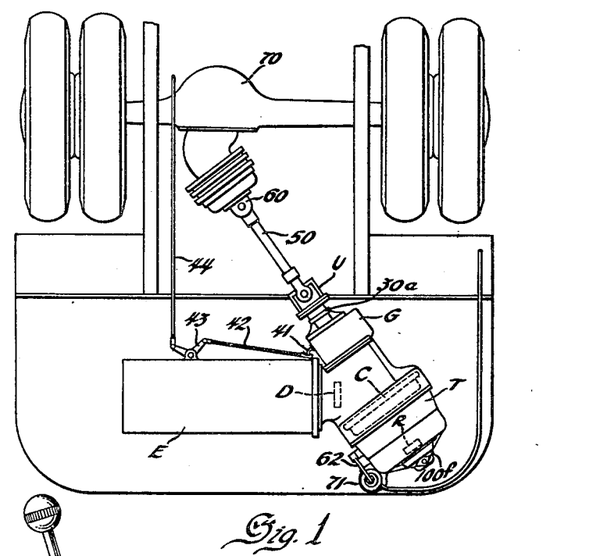
Figure 2:
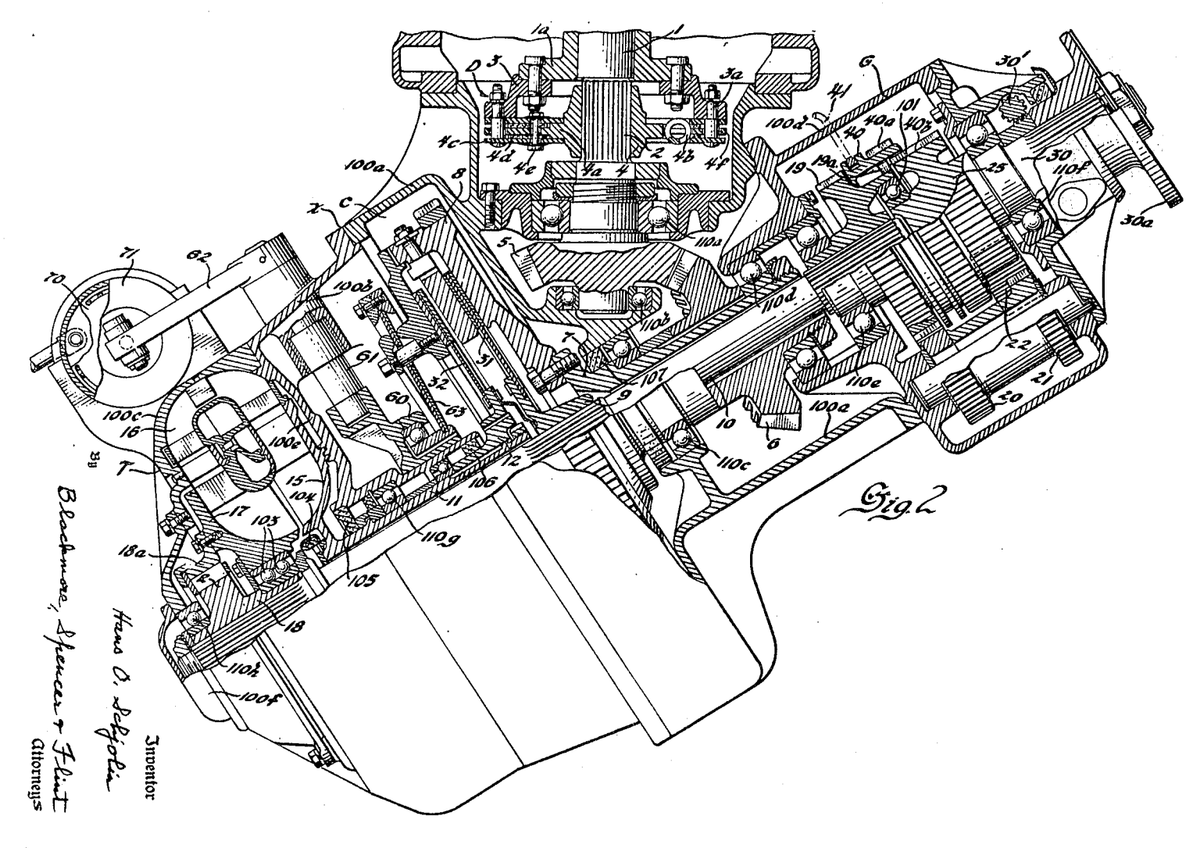
Figure 3:
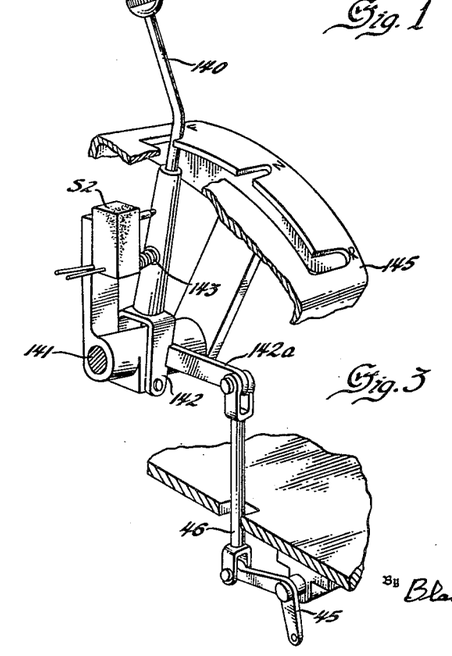
Figure 3 is a perspective view in part section of the gear lever interlock control shown in Figure 4.
Figure 4:
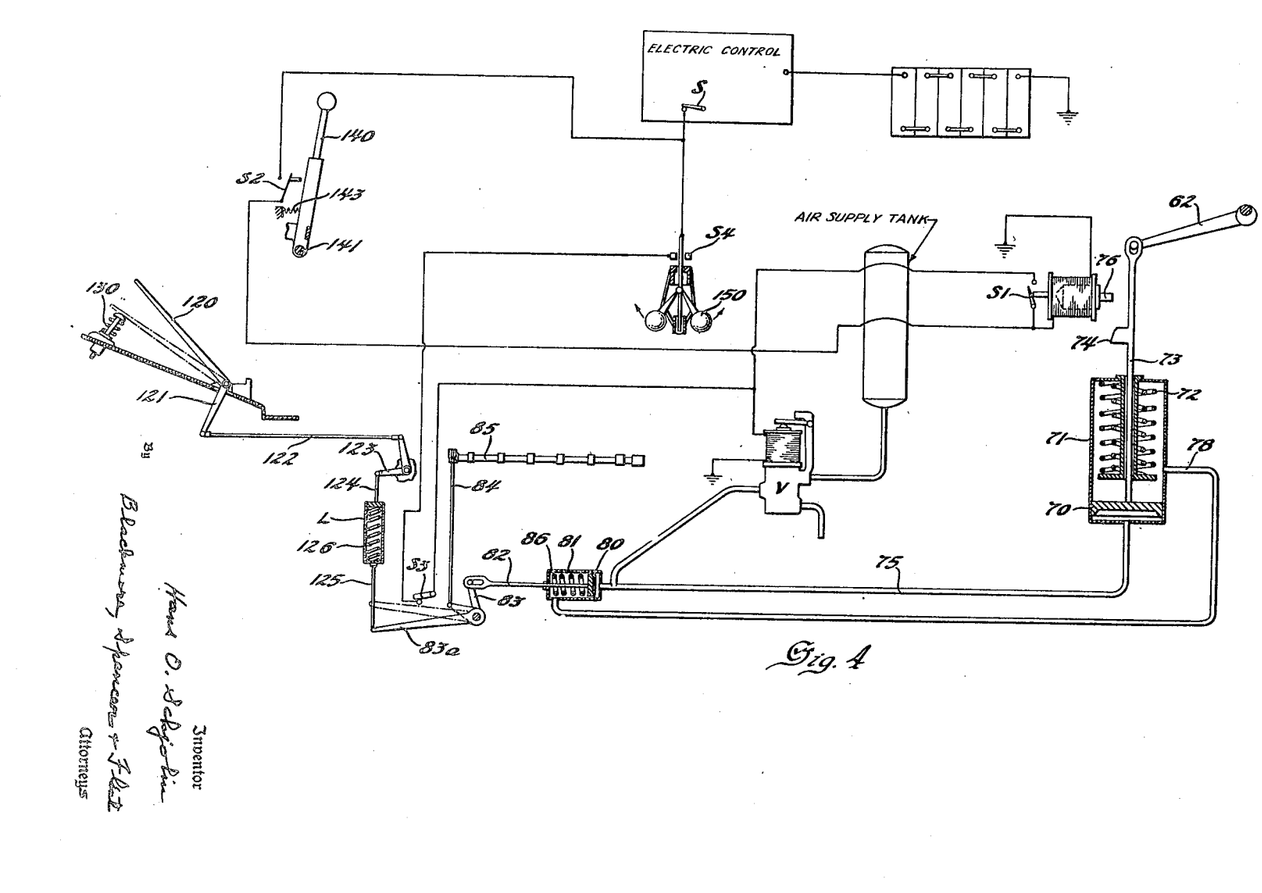
Figure 4 is a diagrammatic disclosure of the external controls for the device of the invention, showing the means for controlling the structure of Figure 2 automatically, while affording overruling control by the operator when required.

The structures in the Figures 1 to 3 are for the greater part, those required to illustrate a fully-operating disclosure of drive mechanism to which the ratio shift actuation and controls of Figure 4 are applied.

The engine shaft 1 in Figure 2 terminates in flange 1ª which is bolted to the driver ring 3 of the friction vibration dampener assembly D, the driven hub 4 of which is splined to the transmission input shaft 2, the latter being formed integral with bevel gear 5 meshing with bevel gear 6 of the transmission input sleeve 7.

The input driving drum 8 is bolted to sleeve 7 and is a part of the double clutch assembly C which connects the drive of the engine with either of driven clutch plates 31 or 32.

The transmission main shaft 10 is splined to accommodate the hub 9 of clutch driven plate 31; it extends through the transmission to the left where it is splined to the inner member 18 of the roller clutch assembly R, and extends to the right where it is splined to drive the combination gear and jaw clutch 19 of the reversing gear unit G.

The clutch plate 32 is riveted to hub 12 rotating with sleeve 11 integral with the impeller 15 of the torque converter unit T. A torque converter unit T shown in section in the present example of Figure 2, is similar to that of my U. S. Letters Patent 2,308,113 filed October 4, 1940, and issued January 12, 1943. The unit consists of three fundamental elements; an impeller 15, a fixed reaction assembly 16, and a driven member 17, the latter being bolted to the external member 18ª of the roller clutch assembly R. Collar 60 slides axially to shift the inner radial fingers of clutch plate loading spring. The clutches 31, 32 provide the forward drive-changing means and the associated clutch loading parts in the connections between the lever 62 and the place of pressure application at plate 63, constitute the drive actuating members, described in detail further below.

At the right of Figure 2 is shown the reverse gear unit consisting of a gear train having input member 19, and output gear 25 integral with shaft 30, splined to the output driving flange 30ª. The gear 19 meshes with input counter gear 20 which is rotatable with the counter shaft section, to which the second counter shaft gear 21 is attached or is integral. A splined collar 40 which also may be called a slider member is toothed externally at 40ª for meshing with reverse idler gear 22, and is carried on a forward extension of the teeth of gear 25 with which its internal teeth 40ᵇ mesh. The gear 19 has external teeth 19ª which are engaged with the teeth 40ᵇ of the slider 40, when the latter is moved into forward position. The train of the gear unit consists of input gear 19 splined on shaft 10 and constantly meshed with the countershaft group 20, 21 which spins idler 22. The slider 40 carries internal teeth 40ᵇ which may be driven by teeth 19ª of gear 19 when the slider is advanced to the left as shown in Fig. 2. For reverse shift, the slider is moved to the right, disengaging teeth 19ª and meshing teeth 40ª with the teeth of idler 22. Since the torque converter delivers no drive torque at idle throttle when this shift is made, the shift proceeds without a need for a neutral dwell so that internal teeth 40ᵇ of slider 40 may shift directly from mesh with 19ª while teeth 40ª mesh with idler 22. The slider 40 and associated parts include the selective forward and reverse driving elements. The linkage 41, 42, 43, 44 is operated by the construction shown in Fig. 3.

When the slider is moved toward the rear of the gearbox it establishes the drive through the reverse train 19, 20, 21, 22, 40 and 25.

In the arrangement and demonstration of the drive noted above, the bevel gears 5 and 6 are related to each other in the ratio of 4 to 5 respectively, so that the sleeve 7 and driving drum 8 may rotate at a somewhat slower speed than that of the engine.

The vibration dampener unit D is arranged to permit limited relative movement between the flange 3 and the hub 4 by virtue of radial slots for the bolts 3ª, cut in the plate 4ª of the hub 4. The slots are of wider dimension than the diameter of the bolts and the latter are centered through the action of compressed springs 4ᵇ held in apertures in the retaining plates 4ᶜ. The bolts 3ª have adjusting nuts which exert a given tension for establishing friction drag between the retaining plates 4ᶜ and the central flange 4ᵃ of the hub 4. Additional friction is obtained by the inclusion of friction washers 4ᵈ placed between the external plates and the central flange and providing a friction force augmented by the tightening of bolts 4ᵉ which pass through the assembly at a shorter radial distance than bolts 3ᵃ. The permitted clearance for the movement of the bolts 4ᵉ with respect to the central flanges 4ᵃ is obtained by the use of a circumferential slot 4ᶠ in flange 4ᵃ. Belleville washer springs are included in the assembly of bolts 4ᵉ so that a considerable friction preload adjustment can be set up by the operator, an expedient useful, in order to have the apparatus successfully absorb the torque vibrations of large heavy engines. It will be observed that this device can be tuned over a limited range of vibration frequencies by changing of the initial tension provided by bolts 3ᵃ and 4ᵉ.

The unusual arrangement of the foregoing-described drive has a number of advantages discussed elsewhere in this specification. It will be noted that the diagonal casing 100ᵃ can be completely detached for unit replacement. It is useful that the casing portion 100ᶜ may be detachable from 100ᵇ for service to turbine parts, and also that 100ᵇ be detachable from 100ᵃ so that different designs or forms of torque converters and clutches can be installed. It is of primary importance that the casing portion 100ᶠ at the leftward end may be radially detached without disturbing the remainder of the driving mechanism for the purpose of replacing or adjusting freewheel clutch R. It is further important that the joint at X between casing sections 100a and 100b be provided. It will also be noted that the reversing gear unit G can be separated by ready removal of the casing portion 100ᵈ, so that whatever infrequent adjustments or replacements are required in this unit can be readily made, quickly and simply.

In order to accomplish the above successfully, it is essential that the arrangement and gearings to support the shaft and driving parts correspond with the major axes of drive. To this end bearing 110ᵃ and bearing 110ᵇ support the transmission input shaft 2 firmly in the casing section 100ᵃ. The diagonal main shaft 10 is supported in bearings 110ᵉ and 110ʰ in the casing sections 100ᶜ and 100ᵈ, while the input driving shaft sleeve 7 is mounted in casing 100ᵃ and 100ᵈ in bearings 110ᶜ and 110ᵈ. The rear shaft 30 is piloted by bearing 101 in the inner pocket of gear 19 of shaft 10, and for support in the casing 100ᵈ and the flange plate 100ʲ by bearing 110ᶠ. The torque converter sleeve 11 is supported in web 100ᵉ of the casing section 100ᵇ by bearing 110ᵍ, and the circumferential guide rings for the impeller 15 such as shown in Figure 2 may provide support in web 100ᵉ. The sleeve 60 of the clutch operating mechanism is mounted to slide on an extension of the web 100ᵉ, for supporting the leftward portion of hub 12 and the sleeve 11, and the double-row bearing 103 of Figure 2 may align the turbine rotor 17 with respect to the shaft 10 and the roller clutch inner input 18.

The arrangement of the present demonstration includes the seal 104 between the turbine and the hub impeller 15 and the flange of 10; the seal 105 located between the hub of impeller 15 and the web 100ᵉ of the casing; and the seal 106 prevents leakage of grease through the shafting and the extension of web 100ᵉ into the compartments formed by casing for the clutch assembly C. The seal 107 is located externally with respect to sleeve 7 and prevents flow of lubricating oil from the gear spaces of casing section 100ᵃ into the compartment housing the clutches 31 and 32.

The clutch collar 60 of Figure 2 may be controlled for its transfer of drive between the clutch plate 31 or 32 by cam member 61 mounted to rotate in the sidewall of the casing 100ᵇ as shown in Figure 2. The cam is rotated by arm 62 reciprocated by the piston 70 shown in section in Figure 4. A method of operation of this double clutch control apparatus is described in my U. S. Letters Patent No. 2,308,113, filed October 4, 1940, and issued January 12, 1943, and shown in Figure 6 of that patent.

Fig. 2 shows in detail the relationship of the parts operated by the clutch actuator mechanism to provide alternate drive by the clutch drum 8 of the clutch discs 31 and 32, acting as the forward drive-changing means.

Engine-connected gear 6 and sleeve 7 support and drive the presser plate 33 in its gripping of disc 31 or disc 32. Shaft 10 carries splined hub 9 and disc 31 equipped with proper facings. Rotating on shaft 10 is hollow shaft 11 attached to splined clutch hub 12 of disc 32 which also has proper friction facings.

Shaft 7 may drive shaft 9 directly thru clutch disc 31 or indirectly thru the torque converter unit shown at the left of Fig. 2, by clutch disc 32.

The clutch control and actuator mechanism consists of fittings 34 bolted to member 8, arranged to restrain the external edges of compound disc spring 63, the inner edges of which may be shifted to the right or to the left by movement of bearing sleeve 60ᵃ and sleeve 60 longitudinally through eccentric 61 moved from outside the gear casing by lever 62.

The fulcrum action is provided by studs 35 and members 8ᵃ, 8ᵇ. Presser plate 8ᵃ carries studs 25 passing thru apertures in disc spring 63, the studs support ring 8ᵇ, while the outward facing portions of 8ᵃ and 8ᵇ are shaped to bear against the faces of spring 63 located between them.

The fittings 34 are attached to bolt 36 headed in the outer portion of presser plate 33, and a spacer collar provides proper longitudinal positioning between the fittings 34 and the plate 33 so that upon axial movement of member 60 the disc spring 63 is flexed about the fulcrum afforded by members 8ᵃ—8ᵇ, and a parallel motion of fittings 34, bolt and plate 33 in the same direction of motion of member 60 results, the plate 33 gripping the plate 31 or 32 against 8 or 8ᵇ at the end of the movement.

This construction is shown in my United States Letters Patent aforesaid, and described therein on page 4, beginning at line 10.

The admission and control of air pressure to the lower face of piston 70 is obtained by the control arrangement of Figure 4, a diagram of the fundamental elements and units required.

The clutch shifting piston 70 is shown in cylinder 71, ready for rocking the clutch operating lever 62 toward the up position, in which the collar 60 of Figure 2 shifts the spring 63 to load clutch plates 31.

The magnet valve V, such as is shown in my U. S. Letters Patent No. 2,322,479, in Figure 3 thereof, when electrically energized delivers reservoir air pressure to the cylinder 71 for raising the piston 70 against spring 72, or is spring-biased so that it shuts off the reservoir pressure and releases pressure from cylinder 71, to permit spring 72 to lower the piston 70.

The current supply to the magnet valve V passes through stop switch $S^1$, and gear lever switch $S^2$ from the battery; and also passes through overrule switch $S^3$ and governor switch $S^4$; in parallel paths.

The piston rod 73, has a striker 74, which intersects the lock pin 76 of stop switch $S^1$ when air pressure lifts the piston 70 toward direct drive position.

The air pressure delivered by the magnet valve V to line 75 reduces the engine throttle setting, the small piston 80 of cylinder 81 having rod 82 linked to bellcrank 83 pivoted to rod 84 of the fuel injector rack 85, and operating through the body of spring 86. While the drawing herewith shows a fuel injector control, it is obvious to those skilled in this art that a common combustion engine throttle member could be operated by rod 84 without exercise of invention. The term "throttle" herein used may be taken to describe either injector control or throttle, as is well known. The clutch operating cylinder 71 is ported to air line 75, connected to the left portion of the throttle control cylinder 81, so that when the clutch piston 70 rises beyond the port of line 78, the air pressure may flow to the leftward face of piston 80, equalizing that exerted on its rightward face, whereupon the restoring spring 86 returns the throttle rod 84, bellcrank 83 and rod 82 to original position.

The battery current is led through the master switch S, convenient to the operator, and then divides through two paths, one to the governor switch $S^4$, overrule switch $S^3$ and magnet valve V; the other to the gearshift lever switch $S^2$, solenoid stop switch $S^1$ and magnet valve V.

The accelerator pedal 120, operates a sequence of mechanically connected elements such as lever 121, rod 122, bellcrank 123 and the rod 124 of lost-motion device L, the casing of which is attached to rod 125 of arm $83^a$ of bellcrank 83 controlling the throttle rod 84 which is an engine fuel feed control element. The spring 126 normally transfers thrust between rods 124 and 125.

The pedal 120 at full throttle, strikes overrule spring 130 mounted under it on the floor board, which increases the pedal resisting force, but the lost motion device L opens the overruling switch $S^3$, breaking the circuit to the governor and magnet valve V, which causes a transfer of drive from direct-drive clutch plate 31 to torque converter plate 32.

With the vehicle at rest, engine running, the operator's master switch S, being normally closed, the gear lever 140 of Figure 3 being moved to forward drive position, engages the slider 40 of Figure 2 with the teeth 19a of member 19.

Advancing the engine throttle causes the torque converter to deliver torque to shaft 10, since clutch plate 32 is normally engaged.

The governor 150 of Figure 4, driven by gear 30' of Figure 2 closes switch $S^4$, the battery current passing through closed overrule switch $S^3$ to magnet valve V, which energized, opens reservoir pressure to cylinders 71 and 81. The clutch piston 70 rises to rock lever 62 to release clutch plate 32 and engage direct drive plate 31, piston 80 first moves left in cylinder 81, to close the throttle momentarily. As soon as piston 70 uncovers the port of line 78, the air pressure equalizes on the faces of piston 80, and spring 86 reopens the throttle.

Drive thereupon continues in direct drive, unless the speed of governor 150 fails to open the switch $S^4$, whereupon the magnet valve circuit is broken, and the pressure directing valve V shuts off the reservoir and releases the pressure in clutch cylinder 71, so that spring 72 resets the clutch arm 62 and collar 60 of Figure 2 to load clutch plate 32 for drive through the converter.

The momentary release of the throttle upon upshift to direct drive by means of the governor control serves the useful purpose of shortening the shift interval during which excess drag wear of the friction clutches could otherwise occur. I do not find it necessary to apply the reactive control upon the engine throttle during the downshift to converter drive, with this construction. The roller clutch R does not transmit torque until rotor 17 attempts to exceed shaft 10 in speed.

The accelerator pedal 120 at beyond full throttle may break the circuit to the magnet valve V, by opening the overrule switch $S^3$ and thereby set aside the action of the governor 150. The driver has the option of initiating a downshift by pedal advancing movement, due to the feel provided by overrule spring 130. The linkage of the pedal 120 to the lost-motion device L, and to the overrule switch $S^3$, and the force of spring 130 are so arranged that the operator feels a decided resistance to further travel of pedal 120, just before the mechanism would open switch $S^3$. This pedal-overruling action may be set to occur at about full throttle setting, beyond, or somewhat below, in accordance with the selected drive and engine characteristics. As described herein, the preferred arrangement is to have the downshift-by-pedal effect occur beyond the full throttle pedal setting.

When the air pressure is sliding the piston 70 to the up position, as for direct drive, the striker 74 abuts lock pin 76 of solenoid switch S' at a travel point of piston rod 73 equivalent to a release position for both clutch plates 31, 32, by collar 60 of Figure 2, halting beyond the point.

The above described control disclosure represents a continuation in part of the subject matter of my application for Letters Patent, Serial No. 299,643, filed October 16, 1939, now Patent No. 2,380,677, issued July 31, 1945, in particular the showing of Figures 16 and 17. It is believed well-known in this art to describe the mechanism of Fig. 4 which coordinates the movement of gear-lever 140 and that of accelerator pedal 120 for overcontrol of the drive-selecting action of governor 150, in the category of interfering devices which condition the governor action.

Referring back to Figure 1, rod 44 is connected to bellcrank lever 45 of Figure 3 pivoted to rod 46 extending through the floorboards and pivoted to arm $142^a$ of part 142 of Figure 3; and rocks bellcrank 43 pivoted to rod 42 having swivel connection with the arm of shifter fork 41.

The gear lever 140 of Figure 3 is fastened to shaft 141 rocking with mounting 142 located forward in Figure 1, at the operator's station. The lever 140 and mount 142 rock fore and aft, the mounting 142 of the lever 140 permitting a small lateral motion of the mount 142. The lever 140 is guided in the E-slot of the upper portion of the casing 145 for reciprocation, and for lateral motion into the slot passages "F" "N" and "R" for forward, neutral and reverse shift operation.

The switch $S^2$ of Figure 3 is supported adjacent the lever 140, which is biased toward the gear station positions by spring 143. The striker pin 76 of S' always protrudes in the path of the striker 74 of rod 73, whenever the gear lever 140 is in the left, or continuous portion of the E-slot, with switch S² closed. This halts the piston 70 of cylinder 71 in mid-position or neutral, as the air under the piston 70 causes it to rise. The solenoid armature 76 and cam 74 of rod 73 may be regarded as an interfering device interrupting the operation of piston 70 in its fluid pressure stroke.

The lever 140 as a transmission control member, mechanically operates slider 40 of Figure 2 by appropriate linkages, and its action constitutes an improvement over the arrangement of Figure 9 of my Letters Patent U. S. 2,322,479.

A fluid torque converter of the type shown in the present demonstration does not have adjustable mechanical members for varying its drive characteristics, which latter are therefore fixed and determined by its fluid capacity, and by the number, spacing and shaping of its blades. In applying a unit of this character to a specific vehicle load and speed problem, the working out of the factors for best efficiency of the torque converter establishes a narrow range of converter speeds, torque capacity and given speed ratio range, which in turn fix the speed and torque range of the engine used to drive the vehicle through the converter.

The work of keeping large heavy-duty vehicles in operation during an engine shortage, or in operation in the field of war where engine replacement is a major problem calls for ingenuity in adapting engines of differing speed and torque ranges to the drives of one specific type of vehicle, especially when the power transmission of the vehicle has speed and torque response characteristics which are so narrowly limited by the weight, and load range and allowed speed of the vehicle. Experience has shown that with a vehicle drive assembly of the above noted arrangements with a gasoline-fueled engine, it cannot be directly replaced by a slower speed diesel engine of the same horsepower rating, without a loss in both economy and performance. The problem cannot be solved by changing the rear axle ratio since this will destroy the close harmony of the fluid torque converter characteristics with those of the vehicle drive. The invention herewith provides for ready removal and replacement of the engine, and the equally ready change of drive gears between the engine and the power transmission assembly, which permits the fluid torque converter and the clutch parts to be readily replaced while drive mechanism between it and the vehicle wheels remains undisturbed, as a fixed part of the drive, although the input power means is changed.

For maintaining full schedule field operations, the invention herein enables the heavy-duty vehicle to continue in indefinite, long service supported only by replacement engines, converters and gear pairs corresponding; eliminating further need for field supply or warehousing of various sizes of torque converters and axle gears.

In such field operations where it may be necessary to retain the torque converter in the vehicle and use another engine of a different power characteristic, the gear pair 5.6 may be replaced by a gear pair of differing ratio to match the new engine to the torque converter, in the following manner: the housing 100ª is detached from the engine casing across the joint shown, and this permits the withdrawal of the drive assembly with the casing 100ª, since the jackshaft 2 may slide free of collar 4ª on splines 4. The retainer bolts for bearing 100ª are removed, permitting removal of gear 5 and shaft 2.

The casings 100ª and 100ᵇ are separated at X and the whole assembly to the left, may be slidden free, since shaft 10 is only splined to clutch gear 19, and shaft 7 with gear 6 is released from bearing 110ᵈ by release of the nut and screw fitting shown. The bolts holding drum 8 to shaft 7 are removed and the new shaft with gear, replacing 6.7 installed. The reverse of this sequence is followed with the new gear pair in place, a separate unit assembly of jackshaft 2 and gear 5 being required. The convenience of being able to detach whole units of this otherwise complex assembly for such replacement operations is believed amply demonstrated herein.

It is obvious that with the facilities provided by the invention, the vehicle so equipped, regardless of engine failure or of shop time needed for engine repair or adjustment, can continue in effective operation for longer periods "a-wheel," and thus have its useful load-carrying life considerably extended, on a "service-per-time" basis. This quality is not only important during peace when operating cost-time factors regulate profits, but also during war when meager and scattered field service facilities are overloaded by the requirement for mobility, and by the frequent losses of remount stations.

Another important phase of the invention is that of the space saving afforded by the angle drive grouping which places the entire power transmission and torque conversion mechanism on the angle drive centerline. With rear-engined power plants, there is a constant problem of finding space for cooling apparatus, accessory mechanism such as starters, compressor systems, air conditioning machinery, special electrical generator equipment and the like. The present invention relieves the transverse power plant compartment space at the driving side of the engine, so that the necessary width of the vehicle can be less, or the saved space can be used for accessory devices which otherwise use up "payload" space elsewhere in the vehicle.

The normal power plant which includes the transmission in line with the engine has become a mass and volumetric problem with the utilization of flexible mountings to assist in absorption of torque vibrations, because of the great linear extension of the masses involved in the torque-supporting system.

While the casual observer is not aware of the importance of saving a few pounds of weight of driving parts nor that such savings are reflected in savings in bearing and casing weights, it is understood by those skilled in the art who will appreciate the teaching of the present invention which provides improvement in economy, performance and extension of useful life of motor vehicle drives.

The arrangement herein of composite casing compartmenting for quick removal of unit sections of gearing, clutches, converter, and shafting without disturbing other members of the drive assembly is believed unique. It will be noted that the converter output roller clutch R is readily exposed for inspection and servicing without requiring the other units to be disassembled; the converter unit T is also removable with the unit R; the compartment for the clutches C may be opened also with the detachment of units R and T; and the assembly G at the opposite end of the power transmission is likewise as readily serviced. The assembly may also be detached bodily from attachment to the engine casing for changing the whole assembly unit. The arrangement of bearings which provides full support for the driving parts is coordinated with the division of the sub-compartments, greatly facilitating removal, inspection and replacement, without disassembly of other units not of immediate concern.

The control system shown in Figure 3 is small, neat and compact. The diesel engine fuel control rack shown, may be mechanically operated through a lost-motion device, from the accelerator pedal, and during a shift from converter to direct drive, is momentarily shifted to reduce the engine speed, and promptly restored when the shifter apparatus reaches the end of travel. It will be noted that the position of the equalizer port of line 78 connected to de-throttling cylinder 81 is at the neutral stop position for the clutch servo piston rod 73. It has not been deemed necessary to duplicate herein the detailed construction of the magnet valve, solenoid neutral stop, governor and switches, since these are shown in my Letters Patents and applications mentioned herein.

The arrangement of parts to provide pedal feel so that the operator may determine and choose whether or not to overrule the governor is believed important, since in the operation of large vehicles in particular, the intuitive sense of the operator in observing the driving conditions is necessary, in order to obtain the maximum usefulness of the automatic control.

These and other advantages noted elsewhere in this specification are provided in the novel assembly described herein in demonstrating the invention. The appended claims are drawn to cover all proper modifications and adaptations and it is not my intention to limit the scope of the invention to the particular embodiments shown herewith, since one skilled in the art and made acquainted with the teachings set forth in the present specification would know how to utilize these teachings while departing from the exact details of construction shown and described.

I claim:

1. In power transmitting devices, a vehicle having a differential driving axle and an engine with its powershaft parallel thereto, selective variable speed drive mechanism coupling said axle and said shaft with the axial centerline of the mechanism lying at an oblique angle to the centerlines of said axle and said engine, and said mechanism including a plurality of ratio changing clutches concentric with said obliquely placed mechanism, said clutches being arranged to provide drive at different speed ratios between said engine and axle fluid pressure actuating means for said clutches, a throttle for said engine, speed responsive control means for said fluid pressure means, fluid pressure control means for said throttle effective during operation of said fluid pressure actuating means, and an accelerator pedal control mechanism for said throttle effective at advanced pedal positions to set aside the action of said speed responsive control means and cause actuation of one of said clutches with release of that one which is driving, and an arrangement of said pedal control mechanism effective to increase the resistance of the said pedal to advancing pressure prior to the advance position of the pedal which is effective to set aside the action of the speed responsive means.

2. In control devices for power transmissions, in which the operator's control station is remote from the apparatus to be selectively manipulated, a vehicle having a transversely placed engine coupled to a variable speed ratio driving mechanism placed diagonally with respect to the centerline of said engine and coupled to a differential axle, forward drive-changing means included in said mechanism control means for said drive-changing means including a speed responsive device effective to establish higher and lower forward speed ratio drives by said drive-changing means and interfering devices controlled by the driver for overcoming and setting aside the effect of said speed responsive device upon said mechanism, including an accelerator pedal mechanism which at a predetermined position of pedal advance is effective to establish a lower forward driving ratio than the ratio otherwise determined by said device, and which prior to reaching of said advance pedal position provides additional resistance to the pressure of the operator's foot as a signal that if further pressure is exerted in advancing the pedal, the aforesaid lower driving ratio shift determined by said device will take place.

3. In the construction set forth in claim 2, the subcombination of selective neutral, forward and reverse driving elements included in said driving mechanism, of driver-operated linkage for changing said driving mechanism between forward and reverse drive by said elements and of said linkage having a connection effective upon said variable speed ratio control means for establishing neutral drive in which said forward drive-changing means is rendered ineffective for given speed ranges of said device.

4. In vehicle controls, variable speed ratio driving mechanism consisting of automatically controlled forward drive-establishing members and of manually selective forward and reverse drive gearing, an automatic control for said members including a speed responsive governor, operator-operable means to control the drive by said members and said gearing including an accelerator pedal operated element effective beyond a given position to set aside the automatic control by said members and coacting with a device effective to signal the foot of the operator just prior to the said element attaining that position, said means further including gearing control means for establishing selective drive by said forward and reverse drive gearing operative in predetermined settings to prevent drive by said automatically controlled forward drive-establishing members, during a given speed range of said governor.

5. In power transmitting devices, a vehicle having a differential driving axle, an engine with a powershaft parallel to the axis of said axle, a relatively short jackshaft serving as the power input driver of said differential driving axle and located obliquely to the axis thereof, selective variable speed drive mechanism providing forward and reverse drive and coupled concentrically to said jackshaft and obliquely to said powershaft for transmitting the drive of said engine to the said shaft, and remotely located controls for said mechanism embodying a first group of control members effective to select automatically the variable speed ratios for forward drive, an automatic control apparatus for said members including a speed-responsive governor, and a second group of members manually operative to nullify the selective action of said apparatus upon said first-named members and to compel a change to neutral or reverse drive by said mechanism.

6. In controls for motor vehicles, a variable speed ratio transmission coupling power and load shafts, a fluid pressure operated device having three operating positions one of which establishes neutral or no-drive within said transmission, a second of which establishes direct drive between said shafts and a third of which establishes variable ratio drive between them, a control system including a controlling member for said transmission operative upon said device for causing same to occupy said positions including a pressure-directing valve for said device adapted to be made operative by operation of said member, control mechanism for said valve, and a movable stop controlled thru said system and by movement of said member for locating said device in said neutral position upon predetermined setting of said member.

7. In the combination set forth in claim 6 the sub-combination of a gear selecting handlever for said transmission included in said control system, and of said control member of said system means made operative by selective motion of said handlever for controlling the action of said movable stop.

8. In the combination set forth in claim 6, the sub-combination of a manually operable control for said system, normally movable to select the drive between said shafts and of said member of said control system made operative by such selection motion to compel neutral drive when said transmission control member is moved into a predetermined position.

9. In controls for motor vehicles, a variable speed ratio transmission assembly coupling power and load shafts, said assembly embodying drive actuating members, a power plant and fuel feed control element therefor, a servo operated device for the drive actuating members of said transmission for establishing variable ratio drive between said shafts, control mechanism for said device, control means for said mechanism including a member operated conjointly with said element and including a speed responsive ratio selector coacting with said member and operative to cause said mechanism to operate said device to actuate said transmission members selectively for the driving conditions determined by said selector and said conjointly operated member, an interrupting means in the path of motion of said device, and a manual control for said transmission effective when placed in a predetermined position to energize said interrupting means, whereby the action of the said control mechanism and means is set aside and the said transmission drive members are prevented from actuation by said device.

10. In the art of vehicle drive assemblies, the combination of a vehicle having a differential driving axle and having an engine located adjacent thereto with its powershaft centerline parallel to the centerline of said axle, driving means having a centerline intersecting said centerlines at an oblique angle and adapted to couple the powershaft with the drive of said axle, said means including a fixed ratio input coupling constantly driven by said powershaft, drive changing mechanism driven by said coupling and having an output shaft constantly coupled to drive said axle, selectively operable drive-transmitting power train elements embodied in said driving mechanism and including clutch members adapted to couple said elements, said clutch members being selectively actuable for connecting the drive between said input and output shaft couplings, and operator-operable means having control elements remotely located in the fore portion of said vehicle which are effective to select and cause actuation of said clutch members for establishing said selective drive connection, said means including a pedal-operated device operable to initiate said selection action.

11. In a rear wheel driven vehicle, the combination with an engine transversely mounted at the rear of the vehicle, of a transversely mounted differential axle with its centerline parallel to the centerline of the engine, of a variable speed-ratio drive changing mechanism having a drive centerline intersecting said centerlines at an oblique angle, power conversion couplings joining input and output members of said mechanism to said engine and said axle respectively, said couplings constantly connecting said members for all drive conditions of the said vehicle, of drive changing control means embodied in said mechanism actuable to provide different power trains between said members, of controls for said drive changing means including an element selectively operable by an operator, of control devices for said drive-changing control means and of linkages connecting the said devices with said controls, whereby effective operator control of the obliquely located mechanism is afforded.

12. In the combination set forth in claim 11, the sub-combination of said drive-changing mechanism embodying a fluid torque converter unit arranged to transmit forward and reverse drive between said engine and said axle, and of said drive changing control means being specifically operable to establish change between forward and reverse drive thereby, for selected settings by said controls of said control devices.

13. In the combination set forth in claim 11, the sub-combination of said control devices further including an engine-throttle control element for said engine, a speed responsive element adapted to coact with said throttle control element, and a foot-operated member controlling said throttle control element while likewise operative to interrupt the action of said speed responsive element for predetermined settings of said foot-operated member, wherein the said control devices provide automatic change of said drive-changing control means.

14. A vehicle having a transversely mounted engine at the rear with a transverse power shaft, wheels and wheel axles for driving the vehicle, a transverse axle housing for said axles having a centerline parallel to that of said shaft, differential gearing in said housing adapted to transmit drive to said axles, a fixed ratio bevel gear unit driven by said shaft, a diagonally located power transmission assembly arranged to transmit the power of said engine to said differential gearing, said assembly having a diagonally located centerline intersecting the centerlines of said shaft and said differential axle housing, said assembly having an output member constantly coupled to the input of said differential gearing and having an input member constantly driven by said unit, drive changing means included in said power transmission assembly selectively operative to transmit forward and reverse drive between said members, to transmit a range of infinitely variable speed ratios therebetween and likewise operative to disconnect the drive of said assembly, and operator-operable control means for said drive-changing means located in the forward portion of said vehicle effective to initiate the selective drive transmitting operations described for the said drive-changing means.

15. In the combination set forth in claim 14, the sub-combination of a space arrangement wherein the said axle housing lies forward of said engine, of elements of said drive-changing means for changing the forward drive ratio of said assembly being grouped on the said diagonally located assembly centerline rearward of the point of intersection of said latter centerline with that of said engine, and of the said control means for selecting the drive provided by said elements and the said operator-operable means so located in the forward portion of said vehicle, being equipped with connections operable to compel complete interruption of the drive of said assembly between said members at the will of the operator.

16. In power transmission controls for vehicles, an engine, a variable throttle for the engine, a shaft driven by said engine, a forward and reverse gear unit connected to a load shaft, an intermediate shaft adapted to drive the input of said unit, a fluid torque converter arranged to drive said intermediate shaft from said engine shaft at reduction speed ratios, a direct drive friction clutch adapted to connect said engine-driven shaft with said intermediate shaft, a clutch actuator operable to connect and disconnect said direct drive clutch, a fluid pressure servo device for operating said actuator to connect said clutch or to release same for permitting reduction drive by said converter, a fluid pressure source, a valve for controlling said device by selective delivery of fluid pressure from said source to said device, a control member for said engine throttle, a control member for said unit, and a speed-responsive mechanism, a control system for said valve including an element operated by said first-named control member and an element operated by said mechanism, said elements coacting within said system to cause the valve to deliver pressure to said device or to relieve same therefrom for connection and disconnection of said clutch, and an element operated by said second-named control member effective to interrupt the control action of said elements upon said valve, during periods of predetermined speeds of said mechanism.

17. In power plants for rear-engine-mounted vehicles of the type having a transversely located engine coupled to a power transmission assembly, a remote operator control station, an arrangement of said assembly straddling the centerline of said engine and including a fluid torque converter and selective drive clutches located at one end of said assembly, a forward-neutral-reverse gear unit and output shaft for driving the vehicle axle located at the other end of said assembly, a bevel gear output unit driven by said engine, actuating control mechanism for said clutches located adjacent said bevel gear at one side of the intersection of said engine and assembly centerlines, shift control mechanism for said gearing located at the opposite end of said assembly from said clutch control mechanism, and a driver control located in said station operative upon both said mechanisms consisting of a forward-neutral-reverse selecting lever connected mechanically to said shift control mechanism for said gearing and connected by electro-pneumatic apparatus to said actuating control mechanism for said clutches.

18. In a remotely controlled vehicle drive assembly, a vehicle having its engine, variable speed drive mechanism and final drive located at the rear and its control station for these power-handling elements located in the fore portion thereof, a plurality of clutches of said mechanism adapted to provide reduction or direct drive by selective clutching to said engine, a gear unit adapted to connect said clutches to said final drive for forward or reverse running of said vehicle, a control system for said clutches including fluid pressure servo actuated apparatus made operative to engage and disengage said clutches alternatively so as to provide said reduction or direct drive, said system including a selector for said gear unit located in said control station and positionable for establishing said forward, said neutral or reverse drive, the selector being freely movable to forward, neutral or reverse positions by the operator, a speed responsive control for said apparatus arranged to provide automatic shift to said reduction or direct drives by said clutches, and a stop device made operative by said motion of said selector to require disengagement of both said clutches when the selector is moved to select said forward, neutral or reverse drives.

19. In controls for motor vehicles, a variable speed ratio transmission coupling power and load shafts, a fluid pressure operated device having three operating positions one of which establishes neutral or no-drive within said transmission, a second of which establishes direct drive between said shafts and a third of which establishes variable ratio drive between them, force-applying means normally operative to bias the said device to occupy one of the said second or third positions, fluid pressure actuator apparatus operative to overcome said biasing means and cause the device to occupy the alternative position to that normally determined by said biasing means, a control system for said transmission including a fluid pressure-directing valve for said actuator apparatus, including a member and including automatic forward drive controlling mechanism operative to cause alternate shifting of said device between said second or third positions, and a movable stop made operative by selected motion of said member to stop said device in the said first, neutral position during shift of said device between said second and third positions.

20. A variable speed ratio transmission drive for a vehicle driven by an engine, a fuel control element of said engine, a forward and reverse gear train of said transmission, a selector lever operative to establish the drive of said train, a first clutch of said transmission for connecting said shafts at variable speed ratios, a second clutch for connecting said shafts directly, a clutch operating mechanism for engaging one or the other of said clutches, biasing means for said mechanism normally operative to hold one of the clutches engaged while releasing the other, a fluid servo motor adapted to overcome the said biasing means and release the first of said clutches and hold the second said clutch engaged, a fluid pressure supply system including a valve movable to a first position to vent said motor and to a second position to feed servo fluid pressure to said servo motor, biasing means for said valve normally tending to hold the valve in one of said positions, an automatic control system including a control device operative to overcome the said valve biasing means and cause the valve to occupy the other of said positions, a speed responsive governor device of said system normally operative to permit the said valve biasing means to operate in one speed range thereof and operative upon said control device for causing same to overcome the said biasing means while moving the said valve to the other of said positions, an overcontrol device for said speed responsive device movable by said element to interrupt the speed responsive action thereof during one speed range, a stop mechanism for the motion of said clutch operating mechanism adapted to hold same in a position of disengagement for both said clutches, a control for said stop mechanism operative to preset same for said holding action, and a connection for said control operated by said selector lever effective to require the said stop mechanism to hold said clutch operating mechanism when the said lever is moved toward establishing forward or reverse gear drive of said train.

21. In power transmissions and control apparatus therefor, a variable ratio transmission including a pair of alternately engageable clutches adapted to transmit direct or variable ratio drive between power and load shafts, a clutch actuator mechanism for said clutches including biasing spring means tending to hold one clutch engaged and the other disengaged at end positions of said mechanism, said mechanism having a mid-position in which both said clutches are released, a fluid servo motor normally operative to shift the clutch actuator mechanism from the spring biased position to the opposite end position when fluid pressure is applied to said motor and normally operative to permit the biasing spring means to restore the mechanism to the initial biased position when fluid pressure is released from said motor, a valve for feeding pressure fluid to said motor or for relieving same therefrom, a control for said valve, a stop mechanism for holding said clutch actuator mechanism in said mid-position, an energizing control for said stop mechanism, a control system for said transmission including a control lever movable to selected ratio drive position for establishing selected drives of said transmission, and a connection from said control lever to said energising control operative to station said stop mechanism for holding said actuator mechanism in mid-position during motion of said lever toward selected ratio drive positions.

22. In controls for alternately engageable clutches of power drive mechanisms, in combination, a clutch operating device consisting of a piston rod, a lever moved by said rod, a shaft moved by said lever, a clutch shifting collar and a cam operated by said shaft for moving said collar; a biasing spring for holding said rod in one end position, a piston on said rod, a cylinder for said piston, a fluid pressure feed passage for said cylinder connected to cause said piston to move against said biasing spring during application of pressure to said passage, and to move to the other end position, a valve in control of the said passage, a mid-position latch for said rod, operating means for said latch adapted to preset said latch for holding said rod in mid-position, and a control for said valve and for said latch operative to cause said piston rod to move between the said end positions while energising said latch operating means.

23. In the combination set forth in claim 22, the sub-combination of a variable speed drive transmission connecting driving and driven shafts, a pair of friction clutches included in said transmission arranged for alternate engagement in order to establish direct or variable speed drive between said shafts, a forward and reverse gear train of said transmission, a control linkage operable to establish forward or reverse drive of said train, a manual controller for said linkage, and a connection from said controller to said first named control effective to preset said latch when said controller is moved toward establishing said forward or reverse drive of said train.

24. In the combination set forth in claim 22, the sub-combination of an automatic control system for said valve consisting of a biasing spring and an electrical energising circuit for said valve control, a governor operated switch effective above a given governor speed to close said circuit, and a second switch in said circuit normally biased to maintain said circuit closed and movable to interrupt said circuit so that said valve biasing becomes effective to re-set said valve during intervals when said governor switch is closed.

25. In the combination set forth in claim 4, the sub-combination of a pair of friction clutches acting as said members, an arrangement of said gearing wherein both of said clutches may establish the forward and reverse drive of said gearing, a control element for said gearing embodied in said last named control means, a shifter member actuating said clutches alternately at either end of its motion and having a neutral-drive-determining mid-position, and a control device made operative by selected movement of said gearing control element and effective to hold said shifter member in the said mid-position.

26. In the combination set forth in claim 4, the sub-combination of said members being a pair of alternately engaged friction clutches, an arrangement of said gearing wherein both of said clutches may transmit drive to said gearing for establishing the forward and reverse drive thereof, a control element for said gearing embodied in said last named control means, and a control device made operative by selective movement of said gearing control element to set aside the action of said automatic control, for predetermined speed ranges of said speed responsive governor.

HANS O. SCHJOLIN.

REFERENCES CITED

The following references are of record in the file of this patent:

UNITED STATES PATENTS

| Number | Name | Date |
|---|---|---|
| 2,096,541 | Haltenberger | Oct. 19, 1937 |
| 2,162,937 | Carter et al. | June 20, 1939 |
| 2,322,479 | Schjolin | June 22, 1943 |
| 2,369,126 | Baker | Feb. 13, 1945 |
| 2,369,369 | Peterson et al. | Feb. 13, 1945 |
| 2,380,677 | Schjolin | July 31, 1945 |
| 2,435,930 | Schjolin | Feb. 10, 1948 |